Figure 1:
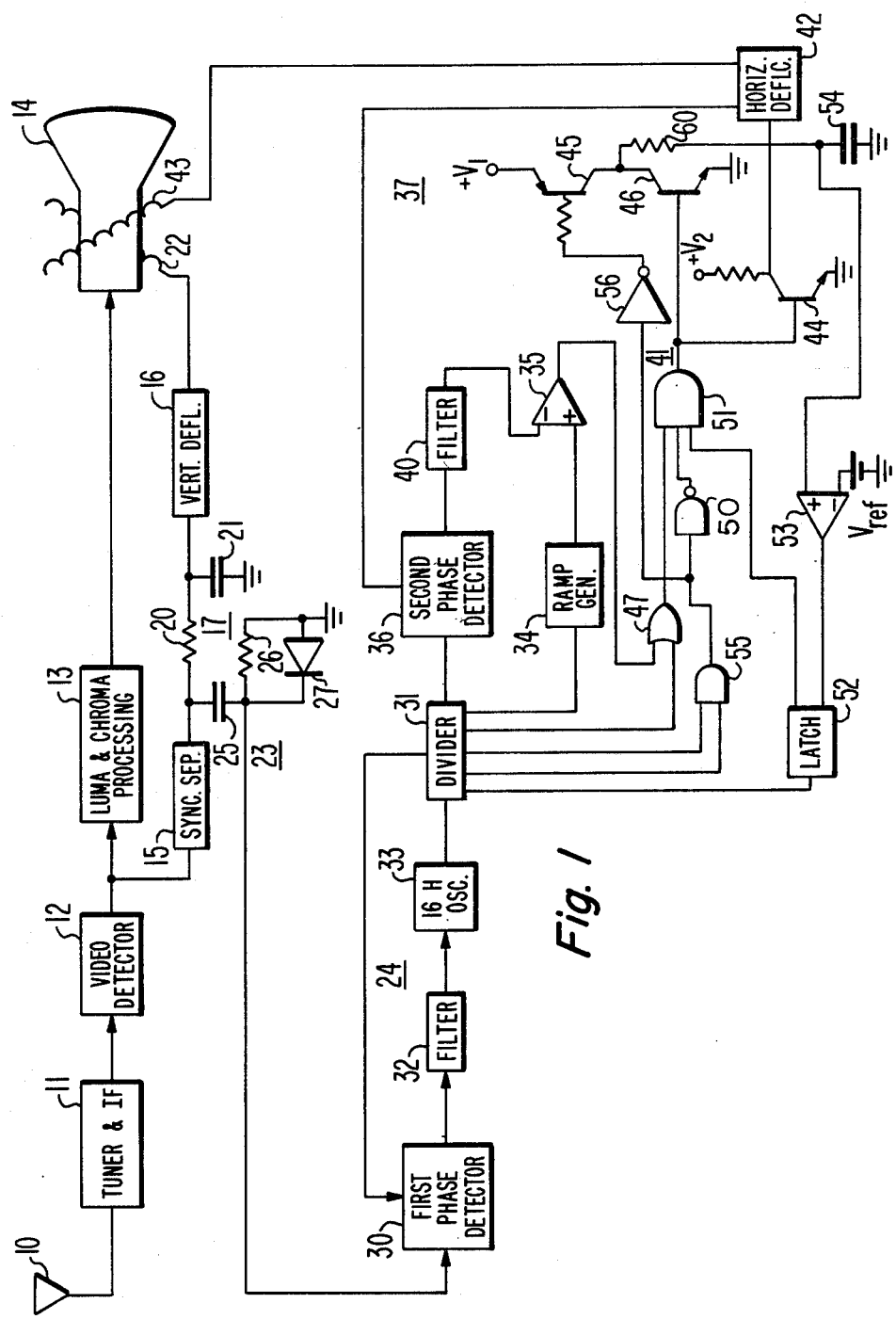

United States Patent [19]
Fernsler et al.

[11] 4,396,948
[45] Aug. 2, 1983

[54] DUAL MODE HORIZONTAL DEFLECTION CIRCUIT

[75] Inventors: Ronald E. Fernsler, Indianapolis, Ind.; Steven A. Steckler, Clark; Alvin R. Balaban, Lebanon, both of N.J.

[73] Assignee: RCA Corporation, New York, N.Y.

[21] Appl. No.: 233,480

[22] Filed: Feb. 11, 1981

[51] Int. Cl.³ .................. H04N 5/04; H01J 29/70
[52] U.S. Cl. .................. 358/158; 315/364; 331/18; 331/20
[58] Field of Search .......... 358/158, 148, 159, 190; 331/18, 20; 315/364; 328/139

[56] References Cited

U.S. PATENT DOCUMENTS

| | | |
|---|---|---|
| 3,891,892 | 6/1975 | Bohringer . |
| 3,898,525 | 8/1975 | Steckler . |
| 3,936,115 | 2/1976 | Dietz ............................ 315/399 |
| 4,188,568 | 2/1980 | Manners . |
| 4,188,641 | 2/1980 | Baker et al. . |
| 4,292,654 | 9/1981 | Steckler ........................ 358/158 |

Primary Examiner—Robert L. Richardson
Attorney, Agent, or Firm—Eugene M. Whitacre; Paul J. Rasmussen; Scott J. Stevens

[57] ABSTRACT

A horizontal deflection turn-on circuit operates in the absence of trigger pulse normally derived by an AFPC loop. Under normal operation, the AFPC loop generates the trigger pulses based on a synchronized phase relationship with sampled flyback pulses. During receiver start-up, the flyback pulses are not present and no trigger pulses are generated. The turn on circuit provides auxiliary pulses which occur later in time than the normal occurrence of the trigger pulses. Means are provided for applying the auxiliary pulses to the horizontal deflection circuit only in the absence of normal trigger pulses.

7 Claims, 10 Drawing Figures

DUAL MODE HORIZONTAL DEFLECTION CIRCUIT

This invention relates to horizontal deflection circuits having automatic frequency and phase control circuitry.

In a television receiver, the horizontal deflection circuitry, in addition to providing the line deflection of the electron beam or beams across the picture tube display screen, also provides many of the receiver supply voltages through rectification and filtering of the high energy horizontal flyback pulses. The supply voltages for the horizontal deflection circuit itself are often derived from the flyback pulses. Obviously, when the set is initially turned on, no flyback pulses are present. This requires special techniques and circuits to temporarily power critical receiver circuitry from alternate sources such as the ac line, until the receiver begins producing usable flyback pulses. A receiver start up circuit of this type is described in U.S. patent application Ser. No. 276,305, a continuation of U.S. patent application Ser. No. 186,789 now abandoned, "Horizontal Circuit with a Start-Up Power Supply", in the name of D. W. Luz.

Some receivers also include horizontal deflection circuits with automatic frequency and phase control circuitry which maintain synchronism between the horizontal drive signals and the incoming external horizontal synchronizing signals. A typical AFPC circuit is described in U.S. Pat. No. 4,317,133, "Two Loop Horizontal AFPC System", in the name of R. E. Fernsler and D. H. Willis. In this AFPC circuit, a first loop synchronizes a 16 $f_H$ oscillator to the incoming horizontal sync rate. The second loop maintains proper timing of the horizontal drive pulses to compensate for flyback pulse phase shift due to power supply or beam current loading on the horizontal deflection circuits. Failure to maintain proper drive signal timing may result in improper raster centering on the kinescope display screen.

The second loop of the AFPC system incorporates a phase detector which utilizes the horizontal flyback pulses as an input. It is apparent that upon initial energization of the receiver, the lack of flyback pulses will defeat the operation of the AFPC system. It is therefore required that some means be provided to initially power the horizontal drive circuitry to allow development of flyback pulses which can then sustain AFPC system operation.

In accordance with the present invention, a horizontal deflection circuit turn-on means is provided. The turn-on means is in a television receiver incorporating automatic frequency and phase control circuitry having means for providing drive signals to a horizontal deflection circuit in a predetermined frequency and phase relationship with external synchronizing signals. The drive signals are provided in response to trigger pulses occurring at a horizontal deflection rate and derived from a feedback signal from the deflection circuit. The turn-on circuit operates in the absence of this feedback and comprises a source of horizontal rate pulses occurring later in time during a given horizontal deflection interval than the trigger pulses. Means, coupled to this signal source, are responsive to the horizontal rate pulses only in the absence of the trigger pulses in order to apply the horizontal rate signals to the horizontal drive signal providing means.

In the accompanying drawing,

FIG. 1 is a partial block and partial schematic diagram of a television receiver having a horizontal deflection circuit which includes automatic frequency and phase control circuitry; and FIGS. 2a–2i show waveforms useful in understanding the operation of the present invention.

The television receiver of FIG. 1 includes an antenna 10 which applies radio frequency signals to the tuner and intermediate frequency circuitry 11 of the receiver. I.F. signals are applied to a video detector 12, which produces a composite video signal. The video information of the composite video signal is processed by luminance and chrominance processing circuitry 13, which applies video drive signals to a kinescope 14.

The composite video signal is also supplied to a sync separator 15, which separates the horizontal and vertical sync signals from the video information. This composite sync signal is applied to a vertical deflection circuit 16 by way of an integrator 17, including a series resistor 20 and a shunt capacitor 21. The integrator 17 supplies integrated vertical sync pulses to the vertical deflection circuit to establish the timing of vertical deflection waveforms which are applied to a vertical deflection winding 22 on the kinescope.

A differentiator 23 separates horizontal sync information from the composite sync signal and provides horizontal sync signals to the first loop 24 of a horizontal AFPC system. The differentiator 23 includes a series capacitor 25, a shunt resistor 26, and a clipping diode 27 coupled in parallel with the resistor 26. The horizontal sync signals are applied to one input of a first phase detector 30. The first phase detector 30 also receives an output signal at the horizontal deflection frequency from a divider 31 at a second input. The output signal resulting from a phase comparison of these two signals is filtered by a filter 32 and applied as a control signal for a 16 H oscillator 33, having a nominal frequency which is sixteen times the desired horizontal scanning frequency. The oscillator 33 produces an output signal which is applied to the divider 31.

The divider 31 divides the oscillator output signal by sixteen to produce an output signal at the fundamental horizontal frequency for the first phase detector 30.

Another output of divider 31 is coupled to the input of a ramp generator 34, the output of which is coupled to the input of a comparison circuit 35. A third divider output is coupled to one input of a second phase detector 36 of a second AFPC loop 37.

The output of the second phase detector 36 is filtered by a filter 40 and the filtered output signal is applied to a second input of comparision circuit 35. The output of the comparison circuit 35 is coupled to a pulse generator 41, the output of which supplies a fixed duration horizontal deflection drive signal to a horizontal deflection circuit 42. The horizontal deflection circuit 42 supplies horizontal deflection waveforms to a horizontal winding 43 on the kinescope, and develops flyback pulses for the second phase detector 36.

Pulse generator 41 provides a constant width pulse to horizontal deflection circuit 42 via an output transistor 44. Pulse generator 41 incorporates a monostable multivibrator comprising transistors 45 and 46, gates 47, 50 and 51, latch 52 and comparator 53. Transistors 45 and 46 act as switches, alternately charging and discharging a capacitor 54 via a supply $+V_1$ and ground, respectively. The signals which turn transistors 45 and 46 on and off are generated by the remaining components of pulse generator 41 in the following manner.

Figure 2:
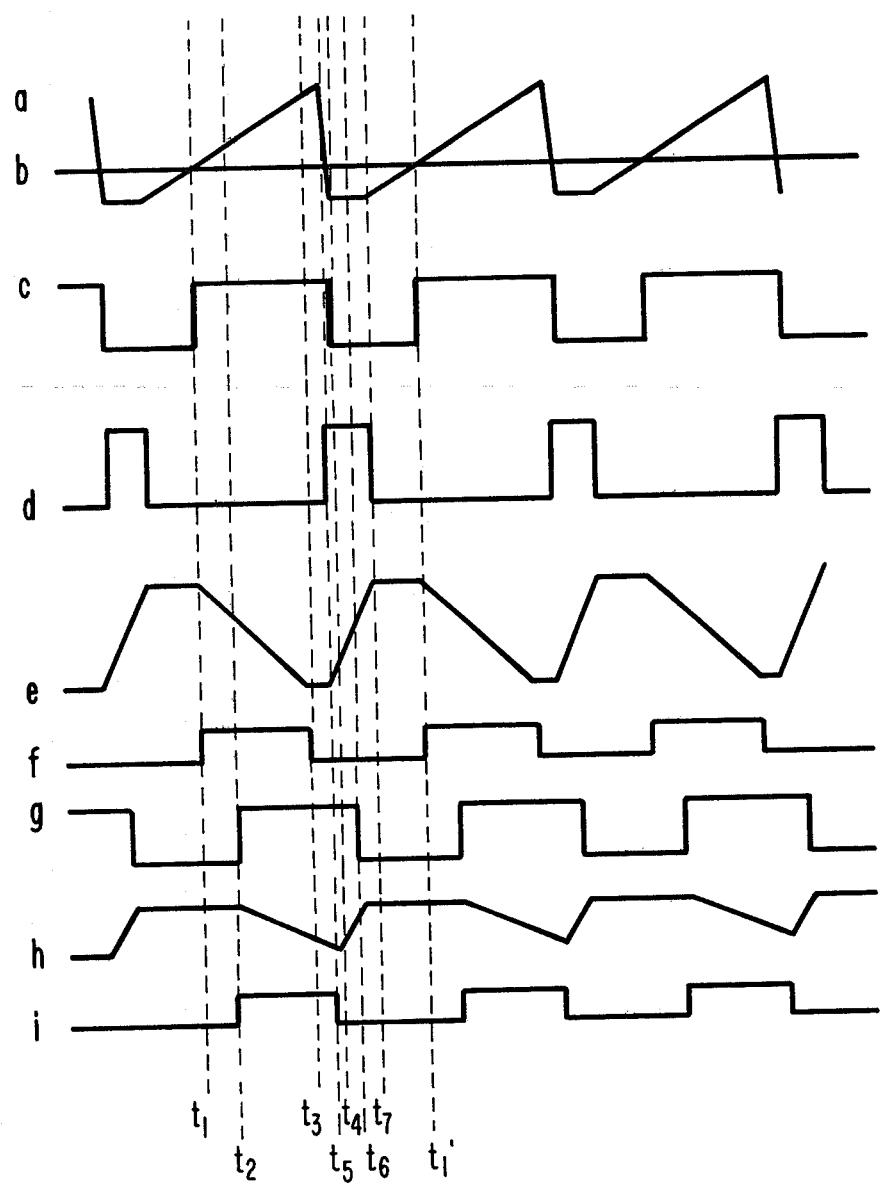

During normal receiver operation, comparator 35 compares a recurrent ramp voltage from ramp generator 34, as shown in FIG. 2a, with a dc voltage (shown in FIG. 2b) from filter 40. Comparator 35 generates a trigger pulse output resulting from the intersection of the ramp and the dc voltage. The time of intersection may vary from line to line in order to maintain proper phase synchronism between the flyback pulses and the horizontal synchronizing pulses for proper horizontal centering of the scanned television raster. The output of comparator 35, shown as occurring at time $t_1$ in FIG. 2c, is applied to one input of an AND gate 51 via gate 47. Gate 47 is also shown as an OR gate, and is enabled by the comparator 35 output.

An output of divider 31 produces recurring 8 microsecond pulses during each horizontal scan line. This string of pulses is processed by a gating circuit 55 having a second input from divider 31 which removes all but one of the 8 microsecond pulses in each line by selectively enabling gating circuit 55 at a particular location in each horizontal line. This remaining pulse, as shown in FIG. 2d, is applied to transistor 45 via an inverter 56. Transistor 45 turns on during this pulse interval which occurs between times $t_5$ and $t_7$ and allows capacitor 54 to be charged from the $+V_1$ supply through an impedance illustrated as resistor 60, as shown in FIG. 2e. This pulse is also applied to an input of NAND gate 50, in order to disable AND gate 51 during the charging interval so that the circuit will not trigger until capacitor 54 is charged. Capacitor 54 maintains its charge at the termination of the charging pulse (time $t_7$) until the occurrence of the trigger signal generated by the output of comparator 35. The occurrence of this trigger signal at time $t_1$ causes an output to be generated by gate 51 turning on transistor 46 and 44 and discharging capacitor 54. Comparator 53 provides an output to reset latch 52 when capacitor 54 is discharged to the reference level. The output of latch 52 disables gate 51 thus turning off transistor 46 and 44. This insures that the output transistor 44 is turned off at the appropriate time.

During normal operation, the occurrence of a trigger pulse at the input of gate 51 will cause gate 51 to generate an output. Gate 51 output shown in FIG. 2f, turns on output transistor 44, thereby driving horizontal deflection circuit 42. Gate 51 output at $t_1$ also turns on transistor 46, causing capacitor 54 to discharge through resistor 60. Capacitor 54 discharges until the voltage across it reaches a reference level determined by a $V_{ref}$ voltage source coupled to an input of comparator 53. When the voltage across capacitor 54 drops to this $V_{ref}$ level, at a time $t_3$, no output is produced by comparator 53, which disables gate 51 via latch 52 thereby turning off output transistor 44 and transistor 46. The horizontal deflection circuit is also turned off, thereby causing the generation of a flyback pulse and initiating retrace. When transistor 46 is turned off, discharge of capacitor 54 stops, as can be seen in FIG. 2e at $t_3$. Capacitor 54 is held at the $V_{ref}$ voltage level until the next 8 microsecond charging pulse at time $t_5$.

The discharge interval of capacitor 54 is of a known duration, thereby insuring a fixed interval of operation of horizontal scan. The occurrence of the discharge interval is variable because of the operation of phase detector 36. This maintains proper centering of the raster regardless of circuit loading variations.

When the receiver is turned on, the horizontal deflection circuitry, although powered by receiver start up circuitry, is inoperative, and hence no flyback pulses are generated, resulting in no retrace pulse input to second phase detector 36 and no trigger pulse output from comparator 35. With no trigger pulse present at the input of gate 51, output transistor 44 will not turn on. Unless an auxiliary turn-on signal is provided, the receiver will never become operative. In accordance with an aspect of the present invention, this auxiliary turn-on signal is provided via gate 47 and divider 31. Divider 31 provides turn-on pulses at one input of gate 47 which occur at a time $t_2$, after the occurrence of the normal trigger pulses from comparator 35. The turn-on pulses, shown in FIG. 2g, have sufficient duration to effectively initiate operation of deflection circuit 42. These auxiliary turn-on pulses desirably occur after the normal trigger pulses in order to minimize interference during normal receiver operation. The turn-on pulses from divider 31 applied to gate 47 may continue beyond the termination of the normal trigger pulses (time $t_4$) to a later time $t_6$. Gate 47 will therefore insure that output transistor 44 is turned on for a sufficient interval each horizontal line to sustain operation of horizontal deflection circuit 42. FIG. 2h illustrates the voltage on capacitor 54 during the turn-on interval during receiver start up when no horizontal retrace pulses are produced but when the auxiliary turn-on pulses illustrated in FIG. 2g are utilized. FIG. 2i shows the output pulse produced during start up operation. Although the output pulse, and hence horizontal scan, may be of the same duration during both normal and start up operation, the start up output pulse is delayed with respect to the normal operation output pulse shown in FIG. 2f. This means that the flyback pulse generated at the termination of the output pulse will also be delayed. The second loop of the AFPC circuit will operate in the presence of the horizontal retrace pulses and synchronize these pulses with external sync signals until normal operation begins at which time the signals from comparator 35, occurring earlier in time than the start-up turn-on pulses from divider 31, effectively disable the latter pulses.

The delayed timing of the start-up turn on pulses with respect to the normal turn-on pulse therefore allows efficient receiver operation during both start up and normal operation. The logic shown in FIG. 1 is merely illustrative of one embodiment providing this necessary timing relationship.

What is claimed is:
1. In a television receiver having means for providing drive signals to a horizontal deflection circuit in a predetermined frequency and phase relationship with external synchronizing signals, said drive signals normally provided in response to horizontal rate signals generated in response to trigger pulses occurring at a horizontal deflection rate, said trigger pulses derived from a feedback signal from said deflection circuit, a horizontal deflection circuit turn-on means operating in the absence of said feedback signal comprising:
 a source of horizontal rate pulses occurring during each horizontal deflection interval and later in time during a given horizontal deflection interval than said trigger pulses;
 means coupled to said horizontal rate pulse source and responsive to said horizontal rate pulses only in the absence of said trigger pulses for applying horizontal rate signals to said horizontal drive signal providing means.

2. The arrangement defined in claim 1 wherein said means coupled to said source comprises gating means responsive to the first in time occurrence of said trigger pulses or said horizontal rate signal.

3. The arrangement defined in claim 1 wherein said source of horizontal rate signal comprises a counter.

4. The arrangement defined in claim 1 wherein said trigger pulses are synchronized with said external synchronizing signals.

5. A horizontal deflection circuit for use in a television receiver comprising:
horizontal deflection means for providing an output signal during normal operation;
a source of external synchronizing signals;
means for providing drive signals to said deflection means in a predetermined frequency and phase relationship to said synchronizing pulses, said drive signals normally provided in response to horizontal rate signals generated in response to trigger pulses derived from said deflection means output signal; deflection means turn-on means, operating in the absence of said deflection means output signal, comprising:
a source of horizontal rate pulses occurring during each horizontal deflection interval and later in time during a given horizontal deflection interval than said trigger pulses;
and
means responsive to said horizontal rate pulses only in the absence of said trigger pulses for applying horizontal rate signals to said drive signal providing means.

6. The arrangement defined in claim 1, wherein said means for applying horizontal rate signals to said drive signal providing means comprises means providing an output signal in response to the first occurring of said horizontal rate pulses or said trigger pulses during a given horizontal deflection interval.

7. The arrangement defined in claim 5, wherein said means for applying horizontal rate signals to said drive signal providing means comprises means providing an output signal in response to the first occurring of said horizontal rate pulses or said trigger pulses during a given horizontal deflection interval.

* * * * *